(12) United States Patent
Uwague-Igharo

(10) Patent No.: US 8,668,258 B2
(45) Date of Patent: Mar. 11, 2014

(54) ARM REST

(75) Inventor: Okunzuwa Uwague-Igharo, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 488 days.

(21) Appl. No.: 13/013,997

(22) Filed: Jan. 26, 2011

(65) Prior Publication Data
US 2012/0187726 A1    Jul. 26, 2012

(51) Int. Cl.
*A47C 7/62*    (2006.01)

(52) U.S. Cl.
USPC .................. 297/188.16; 224/275; 296/24.34

(58) Field of Classification Search
USPC ............. 297/188.14, 188.15, 188.16, 188.19; 224/275, 282, 539; 296/1.09, 153, 296/24.34, 37.8
See application file for complete search history.

(56) References Cited

U.S. PATENT DOCUMENTS

| | | | | |
|---|---|---|---|---|
| 1,702,955 A | * | 2/1929 | Zaday | 297/111 |
| 3,104,131 A | * | 9/1963 | Krone | 297/411.24 |
| 3,356,409 A | | 12/1967 | Belsky et al. | |
| 4,050,624 A | * | 9/1977 | Williams | 229/146 |
| 5,248,183 A | | 9/1993 | Gignac et al. | |
| 5,333,929 A | * | 8/1994 | Slagerman | 297/155 |
| 5,474,199 A | * | 12/1995 | Julius et al. | 220/837 |
| 5,516,191 A | * | 5/1996 | McKee | 297/188.15 |
| 5,730,491 A | * | 3/1998 | Carlsen et al. | 297/188.19 |
| 6,042,180 A | * | 3/2000 | Lombardi | 297/188.11 |
| 6,106,058 A | * | 8/2000 | Sur et al. | 297/188.19 |
| 6,276,582 B1 | * | 8/2001 | Alexander | 224/275 |
| 6,386,629 B1 | * | 5/2002 | Severinski et al. | 297/188.1 |
| 6,547,326 B1 | | 4/2003 | Walkinshaw et al. | |
| 6,568,586 B1 | * | 5/2003 | VanEsley et al. | 229/120.18 |
| 6,623,060 B2 | * | 9/2003 | Gehring et al. | 296/37.5 |
| 6,830,276 B2 | | 12/2004 | Johansson, Sr. | |
| 6,929,304 B1 | | 8/2005 | Dry et al. | |
| 6,932,214 B1 | * | 8/2005 | Zimet | 206/217 |
| 7,104,580 B2 | * | 9/2006 | Clark et al. | 296/24.32 |
| 7,147,259 B2 | | 12/2006 | Radu et al. | |
| 7,188,882 B2 | | 3/2007 | Dry | |
| 7,264,291 B2 | | 9/2007 | Radu et al. | |
| 8,556,320 B2 | * | 10/2013 | Yamagishi et al. | 296/24.34 |
| 2003/0000982 A1 | * | 1/2003 | Gehring et al. | 224/539 |
| 2004/0217023 A1 | * | 11/2004 | Fagg et al. | 206/242 |
| 2005/0178689 A1 | * | 8/2005 | Aardema et al. | 206/521 |
| 2005/0248169 A1 | * | 11/2005 | Clark et al. | 296/24.34 |
| 2005/0263528 A1 | * | 12/2005 | Maldonado et al. | 220/592.2 |
| 2006/0060493 A1 | * | 3/2006 | Marshall | 206/521.1 |
| 2007/0228097 A1 | * | 10/2007 | Recanati | 224/580 |
| 2008/0156808 A1 | * | 7/2008 | Perry et al. | 220/560.03 |

FOREIGN PATENT DOCUMENTS

| | | | | | |
|---|---|---|---|---|---|
| JP | 03208740 A | * | 9/1991 | | B60R 7/04 |
| WO | WO 0007847 | * | 2/2000 | | B60R 11/02 |

* cited by examiner

*Primary Examiner* — David E Allred
(74) *Attorney, Agent, or Firm* — Fay Sharpe LLP

(57) ABSTRACT

An arm rest for a vehicle comprising a housing having a base portion mounted to the vehicle and a lid. The lid is pivotable about an axis with respect to the base portion from a closed position to a deployed position. The base portion defines a compartment. The lid forms an armrest surface in a closed position and a storage tray in an exposed position. The storage tray includes a foldable wall at the edge adjacent the axis. The wall is extended when the lid is in a deployed position and folded when the lid is in a closed position. The remaining edges of the storage tray further includes a wall such that a tray is provided in a deployed position.

21 Claims, 4 Drawing Sheets

ARM REST

BACKGROUND

This disclosure relates in general to storage compartments, for example, storage compartments for holding objects in an automotive vehicle passenger space. More particularly, the disclosure relates to a storage compartment also serving as a combination arm rest and cup holder.

Vehicle cup holder assemblies are popular in modern vehicle designs. Countless variations of cup holder assemblies exist, each variation having varying degrees of efficiency, practicality, manufacturability and cost. Vehicle interior designers have continuously modified cup holder designs to improve aesthetics of the design and to improve functionality as cost constraints continue to tighten. Accordingly, it is desirable to provide an improved vehicle cup holder assembly that achieves these stated goals while reducing the cost of manufacturing and assembly. In addition, concealing cup holder assemblies while they are not in use has also become a significant design consideration. However, while hidden or while in use, the cup holder assemblies should not interfere with other functions and features of the vehicle.

Furthermore, in recent years, the use of mobile phones and other portable electronic devices by occupants of automotive vehicles has increased substantially. The term "mobile phones" as used herein is intended to include wireless telephones, such as analog or digital cellular phones, PCS (personal communication systems), or other portable transmitter/receiver devices used for personal communication. Also, the rise in the use of personal digital assistant devices (PDA), notebook computers, Global Positioning Satellite receivers, portable electronic video games, and other "Bluetooth" compatible hardware has increased substantially. Thus, these devices are widely used in vehicles. However, most vehicles do not provide storage locations for securely holding these devices in place. Usually, these devices are simply laid across a seat, on the floor, or placed in a cup holder. The present assembly advantageously provides a storage compartment for beverage containers, a storage area for mobile phones, or other personal electronic devices or even snacks, and further functions as an arm rest when desired.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter According to one embodiment, an arm rest for a vehicle is disclosed. The arm rest includes a housing having a base portion mounted to the vehicle and a lid. The lid is pivotable about an axis with respect to the base portion from a closed position to a deployed position. The base portion defines a compartment. The lid forms an armrest surface in a closed position. An opposed surface of the lid is exposed in a deployed position. The opposed surface includes a first edge adjacent the axis having a foldable wall extending from the first edge. The wall is extended when the lid is in a deployed position and folded when the lid is in a closed position. The opposed surface further includes edges remote from the axis. Each edge includes a wall such that the opposed surface forms a tray in a deployed position. A cup holder apparatus can be disposed within the compartment. Alternatively, the compartment can include an internal surface formed to function as a cup holder.

According to a further embodiment, an arm rest for a vehicle is provided. The arm rest has a base portion mounted to the vehicle and a lid. The lid is pivotably attached to the base portion for movement between an adjacent position and an extended position. The lid has a first arm rest surface exposed in the adjacent position and a second storage surface exposed in the extended position. The storage surface includes walls extending from its edges. An upper region of the base portion includes a cup holder portion and a lip extending outwardly and above the cup holder portion forming at least one groove therebetween. The groove receives at least one wall of the lid when said lid is in an adjacent position.

According to a third embodiment, an automotive vehicle including a passenger space is provided. At least two occupant seats are disposed within the space and a storage compartment is disposed between the seats. The storage compartment is comprised of a base, a cup holder unit, a lip extending outwardly and above the cup holder unit. A groove is formed between the lip and the cup holder unit. A lid is pivotally secured to the lip and has a closed position wherein the cup holder unit is covered and a deployed position wherein the cup holder unit is exposed. In the deployed position the lid includes four walls extending at least substantially perpendicular to a storage surface. The wall located adjacent the lip is rotatable between an extended condition when the lid is deployed and a folded condition when the lid is closed.

BRIEF DESCRIPTION OF THE DRAWINGS

The following description and drawings set forth certain illustrative implementations of the disclosure, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
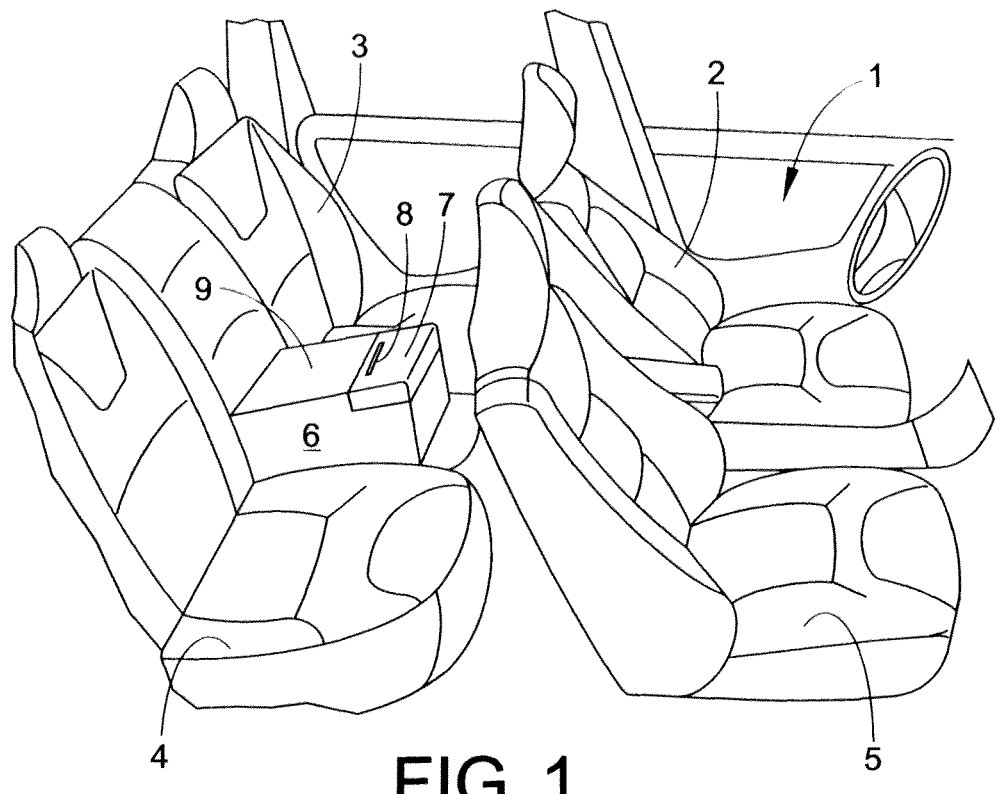
FIG. 1 is a perspective view of the arm rest of the present disclosure residing within the passenger space of an automotive vehicle in a lid closed condition.

Current rear seat arm rests have either an open cup holder, or a cup holder with a lid and a tray. The present design allows for a cup holder with a lid that can also function as a tray. This design allows for a compact light weight and less expensive system that satisfies the need for an arm rest cup holder to be covered and a tray that can be used for phones, ipods, snacks, cameras, etc. This design combines two separate functions into one thus reducing space and cost. Referring now to FIG. 1, a view within an automotive vehicle passenger space 1 is provided. Within the space 1 are occupant seats 2, 3, 4, and 5. Centrally disposed in the rear seating area consisting of seats 3 and 4 is an arm rest 6. Arm rest 6 includes a lid 7 secured thereto with a hinge (not shown) and with a recessed grip 8 to facilitate opening thereof. Of course, any type of finger hold would function adequately. The lid of the cup holder will have a joint that allows it to rotate 180 degrees from the closed position. In the open position, the lid is a tray.

In the depicted closed position, arm rest 6 includes a top surface 9 suitable for passengers to rest their arm upon. In certain embodiments, surface 9 would be formed of a resilient and textured material to provide comfort for vehicle occupants.

Figure 2:
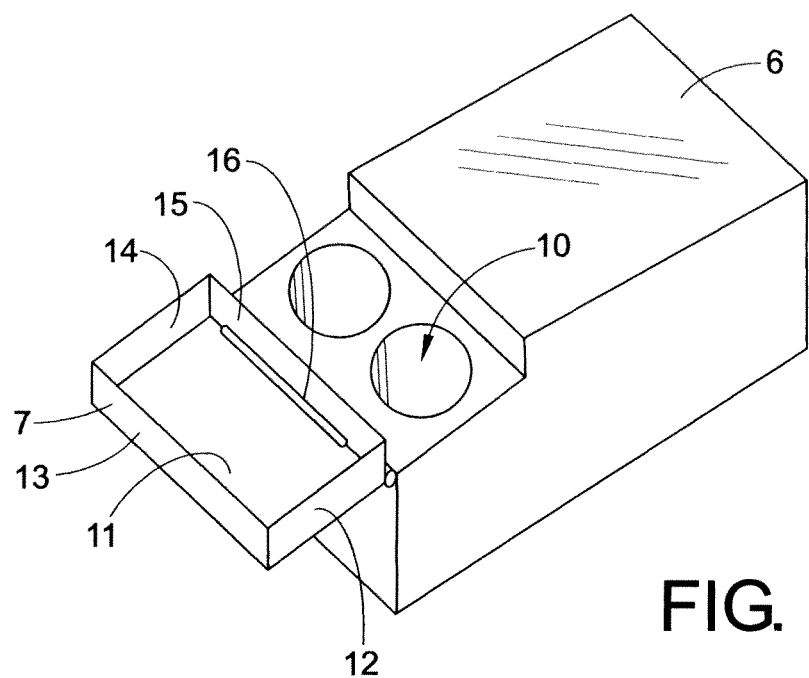
FIG. 2 is a perspective view of the arm rest of FIG. 1 in an open condition.

Referring now to FIG. 2, arm rest 6 is shown in a lid 7 open position. As shown, opening of lid 7 provides access to a cup holder element 10 which can receive two drink containers (not shown). Of course, any number of drink holding positions can be provided depending upon allocated space. Lid 7 includes a storage surface 11 bounded by permanent walls 12, 13 and 14 and a foldable wall 15. Moreover, wall 15 is secured to storage surface 11 via a hinged connection 16. When lid 7 is in a closed position (see for example FIG. 1) wall 15 encounters cup holder element 10 and is rotated about hinge 16 into a substantially co-planar orientation with storage surface 11, which allows lid 7 to properly mate with arm rest 6 and provide a contiguous unit. As will be apparent, storage surface 11, bounded by walls 12, 13, 14 and 15 forms a tray suitable for retention of items such as cell phones, PDA's, other paraphernalia, and snacks.

Figure 3:
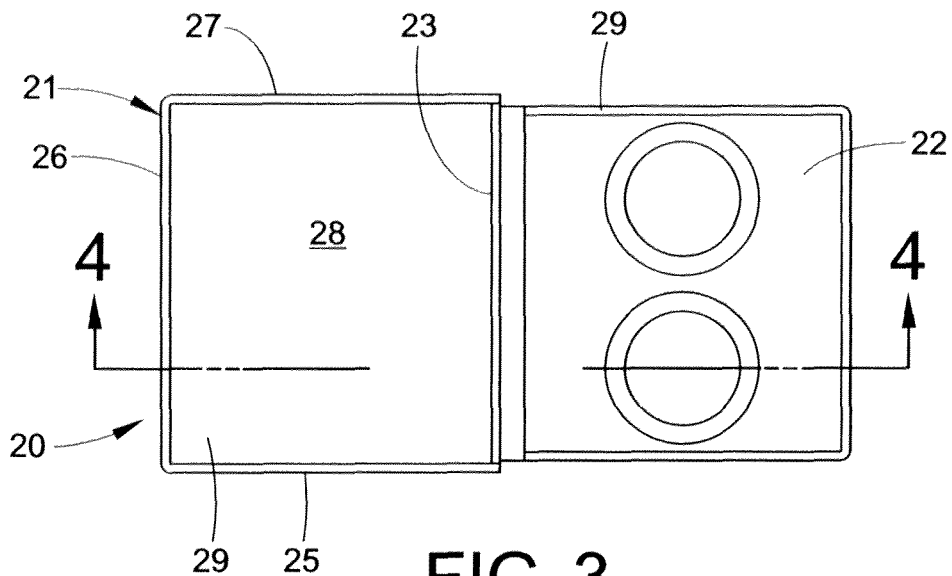
FIG. 3 is a top view of a second embodiment of the arm rest in an open condition.
Figure 4:
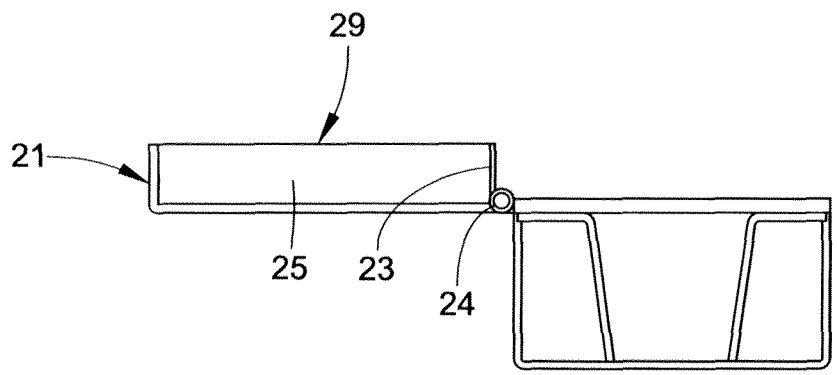
FIG. 4 is a side cross-section view taken along line 4-4 of the cup holder of FIG. 3.
Figure 5:
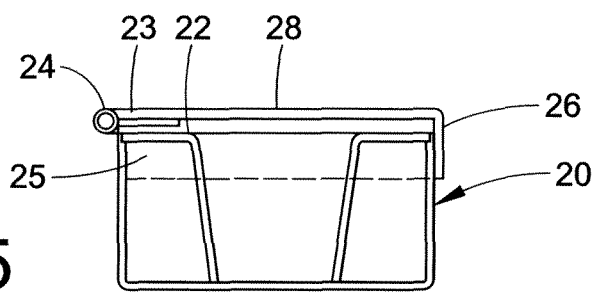
FIG. 5 is a side cross-section view of the cup holder of FIG. 3 in a closed condition.

Referring now to FIGS. 3-5, an alternative arm rest body 20 is depicted. Moreover, lid 21 and cup holder element 22 comprise the entirety of the arm rest body 20. As opposed to the embodiment depicted in FIGS. 1 and 2, wherein the lid and cup holder form only a terminal portion of the arm rest body, the entirety of the arm rest body 20 in FIGS. 3-5 is openable and accessible. However, lid 21 and lid 7 share a common feature. Particularly, a folding wall 23 is provided having a hinge 24 connection to the lid 21. Wall 23 is hingedly biased into an extended position (see FIGS. 3 and 4) upon opening of lid 21, allowing folding wall 23 to extend and form a storage tray 29 comprised of folding wall 23, permanent walls 25, 26 and 27 and horizontal storage surface 28, suitable for storage of mobile phones, personal electronic devices, snacks, keys or other items.

As seen in FIG. 5, upon closing of lid 21, folding wall 23 is engaged by the surface of the cup holder element 22 and forced into a retracted position substantially co-planar to storage surface 28. In this manner arm rest body 20 is returned to an arm rest condition, with permanent walls 25, 26, and 27 overlapping cup holder element 22.

Figure 6:
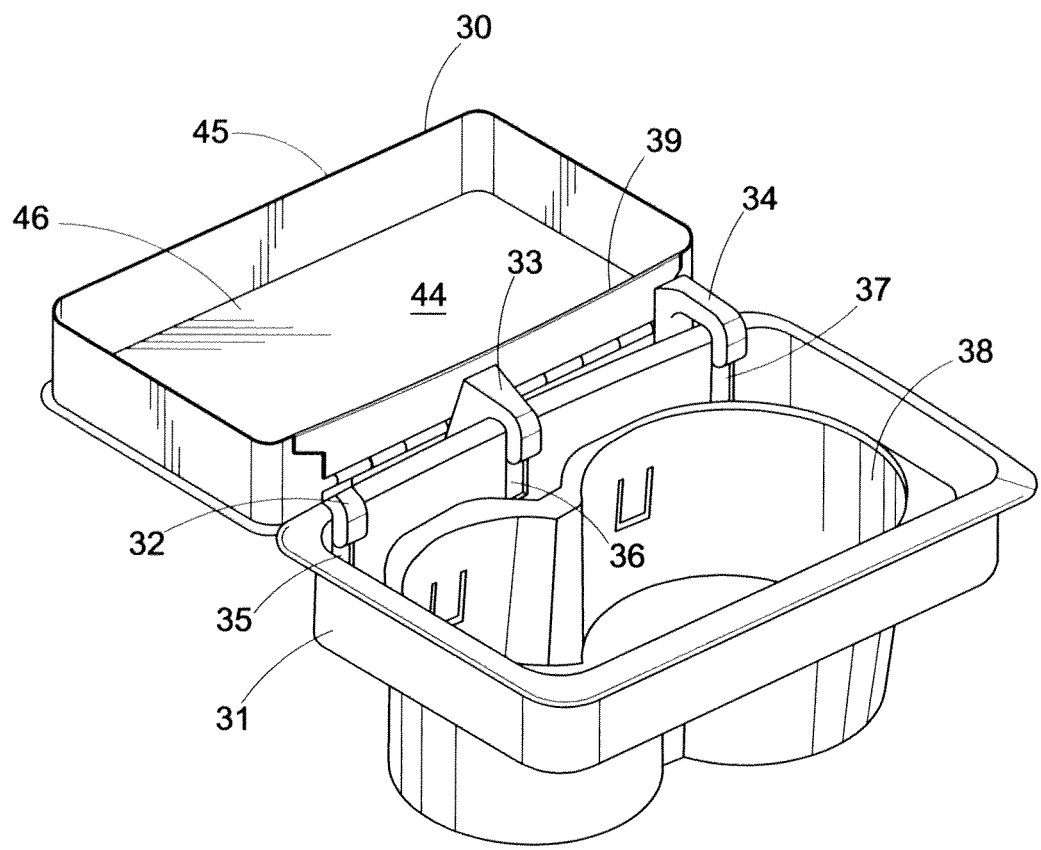
FIG. 6 is a perspective view of a third cup holder embodiment.
Figure 7:
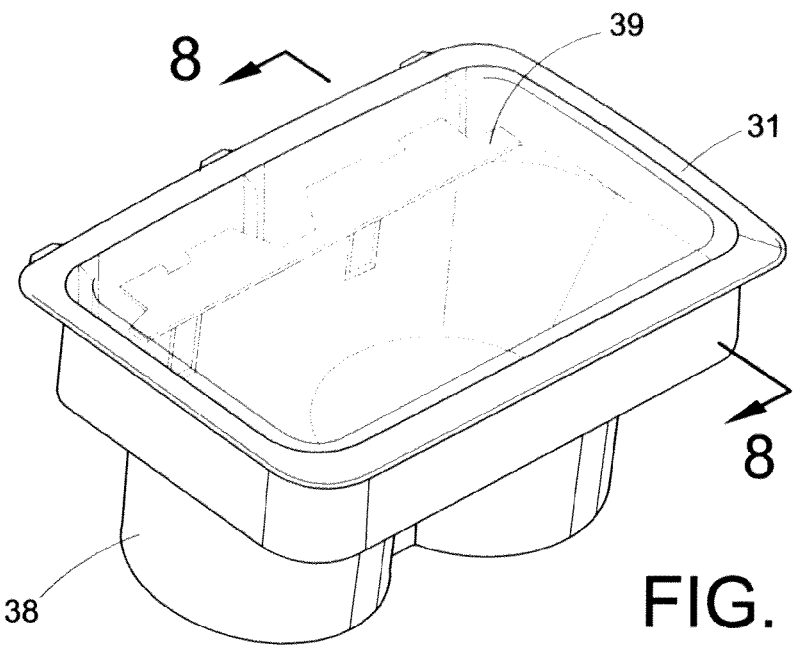
FIG. 7 is a perspective view of the arm rest of FIG. 6 with the lid removed and demonstrating orientation of the folding tray wall when the lid is in a closed position.
Figure 8:
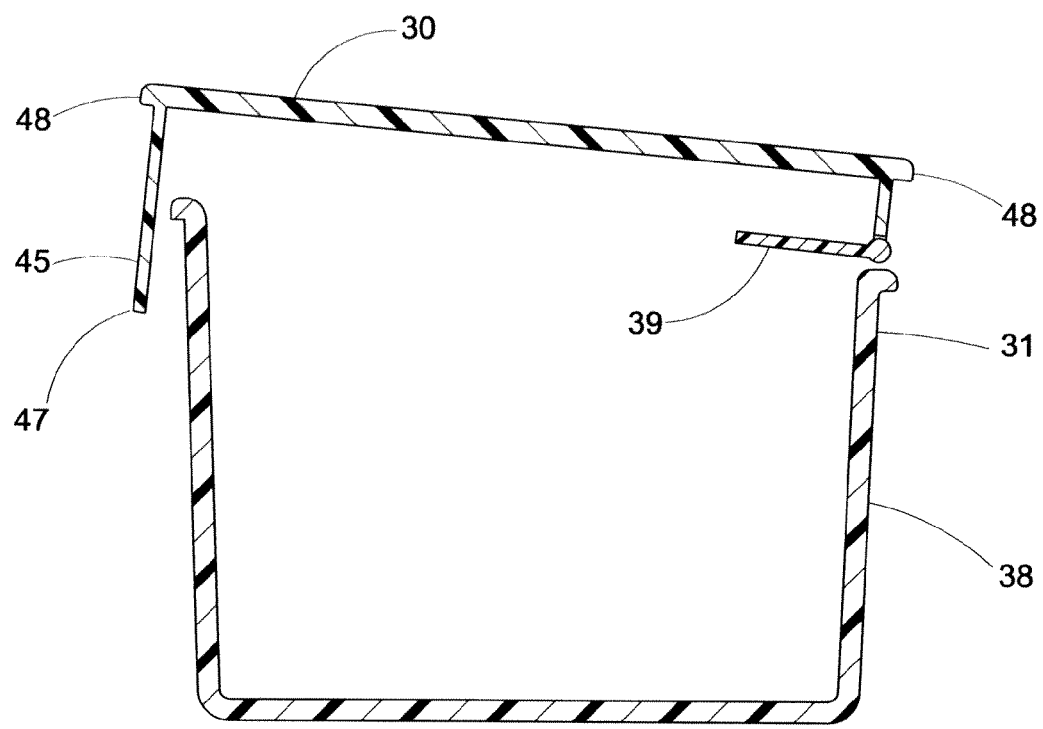
FIG. 8 is a cross-section view taken along line 8-8 of FIG. 7.

Referring now to FIGS. 6-8, an alternative design is depicted. In this embodiment, a lid 30 is attached to cup holder base 31 via hook elements 32, 33, and 34. The hook elements are received within eyes 35, 36, and 37 in cup holder base 31. Cup holder base 31 receives a cup holder insert 38. The lid 30 is equipped with a hinged folding wall 39, shown in a deployed position in FIG. 6, to form a tray 44 in combination with three additional sidewalls 45 and a storage deck 46 for receiving various suitable storage items. Moreover, the hinge assembly associated with folding wall 39 is biased to extend wall 39 perpendicular to storage deck 46 when a counter force is not acting upon the wall 39.

As best seen in FIG. 8, the cup holder base 31 extends outwardly and upwardly from cup holder insert 38. In this manner, groove 47 is formed to receive the permanent sidewalls 45 of lid 30 in a closed position. Cup holder base 31 further includes a lip 48 which could serve as a catch when the assembly is inserted into a base unit (not shown) that is secured to, for example, a seating area or the floor of the occupant space. Moreover, the cup holder can comprise an insert within the base or the base can have an integrally formed internal surface adapted to function as a cup holder.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An arm rest for an associated vehicle, the arm rest comprising a housing having a base portion configured for mounting to the associated vehicle and a lid, the lid being pivotable about an axis with respect to the base portion from a closed position to a deployed position, said base portion defining a compartment, said lid forming an upwardly facing arm rest surface in the closed position, an opposed downwardly facing surface of said lid being inverted and exposed in the deployed position, said opposed surface including a first edge adjacent said axis, a foldable wall pivotally mounted for rotation about said axis and extending from said first edge, said wall being extended when said lid is in the deployed position and folded when said lid is in the closed position, said opposed surface including other edges remote from said axis, each of the other edges including a respective wall extending at least substantially perpendicular from the opposed surface and cooperating with said foldable wall such that said opposed surface is generally surrounded by said walls and forms a tray in the deployed position.

2. The arm rest of claim 1 including a cup holder apparatus disposed within said compartment.

3. The arm rest of claim 1 wherein said compartment includes an internal surface adapted to function as a cup holder.

4. The arm rest of claim 1 wherein said arm rest surface comprises a resilient material.

5. The arm rest of claim 1 wherein said lid includes a finger hold facilitating opening thereof.

6. The arm rest of claim 1 wherein said lid is pivotable approximately 180° between the closed and the deployed position.

7. The arm rest of claim 1 wherein a hinge forms a connection between said lid and said base portion.

8. The lid of claim 1 wherein a hinge forms a connection between said foldable wall and said lid.

9. An automotive vehicle including a passenger space, at least two occupant seats disposed within said passenger space, and the arm rest of claim 1 disposed between said seats.

10. The vehicle of claim 9 wherein said base includes a cup holder.

11. The vehicle of claim 9 wherein said foldable wall is secured to said lid via a hinge.

12. The vehicle of claim 9 wherein three walls are permanently substantially perpendicular to said opposed surface.

13. The vehicle of claim 10 wherein said foldable wall engages said cup holder in a said closed position resulting in rotation of the foldable wall into a substantially parallel orientation with said lid.

14. The vehicle of claim 9 wherein said occupant seats comprise rear passenger seats.

15. The arm rest of claim 1 including three permanent walls extending upwardly from the edges in the deployed position, each permanent wall engaging at least one adjacent permanent wall and said foldable wall engaging two adjacent permanent walls in the deployed position.

16. The arm rest of claim 1 wherein said walls extend upwardly when said lid is in the deployed position.

17. The arm rest of claim 1 wherein said foldable wall resides substantially parallel to said opposed surface when the lid is in a closed position and resides substantially perpendicular to said opposed surface when said lid is in an extended position.

18. An arm rest for a vehicle comprising a housing mounted to the vehicle, said housing including a base containing a cup holder portion and a lid, the lid being pivotably connected to said base portion for movement between an adjacent position covering said housing and an extended position pivoted approximately 180 degrees from the adjacent position and uncovering said housing, said lid including a first arm rest surface exposed in the adjacent position and a second storage surface exposed in the extended position, four walls extending at least substantially perpendicular from said storage surface in the extended position, wherein a first of said walls is proximate said base portion and includes a means for rotation, such that said first wall resides below and substantially parallel to said storage surface when the lid is in the adjacent position and resides at least substantially perpendicular to said storage surface when said lid is in the extended position.

19. The arm rest of claim 18 wherein said walls extend upwardly from the storage surface when said lid is in the extended position.

20. An arm rest for an associated vehicle, the arm rest comprising a housing having a base portion configured for mounting to the associated vehicle and a lid, the lid being pivotable about an axis with respect to the base portion from a closed position through approximately 180 degrees to a deployed position, said base portion defining a compartment, said lid forming an arm rest surface covering said base portion in the closed position, an opposed surface of said lid being exposed in the deployed position, said opposed surface including a first edge adjacent said axis, a foldable wall extending from said first edge, said foldable wall rotating 90° about said axis between an extended state when said lid is in the deployed position and a folded state when said lid is in the closed position, said opposed surface including other edges remote from said axis, each other edge including a respective wall such that said opposed surface in combination with the foldable wall and the respective walls form a tray in the deployed position.

21. The arm rest of claim 20 wherein said edge walls extend upwardly from the opposed surface in the deployed position.

* * * * *